United States Patent
Sato

(10) Patent No.: US 11,415,423 B2
(45) Date of Patent: Aug. 16, 2022

(54) MAP INFORMATION MANAGEMENT DEVICE, MAP INFORMATION MANAGEMENT SYSTEM, AND MAP INFORMATION MANAGEMENT METHOD

(71) Applicant: Mitsubishi Electric Corporation, Tokyo (JP)

(72) Inventor: Takumi Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 158 days.

(21) Appl. No.: 16/644,121

(22) PCT Filed: Oct. 31, 2017

(86) PCT No.: PCT/JP2017/039358
§ 371 (c)(1),
(2) Date: Mar. 3, 2020

(87) PCT Pub. No.: WO2019/087302
PCT Pub. Date: May 9, 2019

(65) Prior Publication Data
US 2020/0271457 A1    Aug. 27, 2020

(51) Int. Cl.
*G01C 21/32*    (2006.01)
*G01C 21/36*    (2006.01)

(52) U.S. Cl.
CPC ......... *G01C 21/32* (2013.01); *G01C 21/3644* (2013.01); *G01C 21/3647* (2013.01); *G01C 21/3667* (2013.01)

(58) Field of Classification Search
CPC ............... G01C 21/32; G01C 21/3644; G01C 21/3647; G01C 21/3667; G01C 21/30;
(Continued)

(56) References Cited

U.S. PATENT DOCUMENTS

2011/0118973 A1* 5/2011 Shih .................. G06K 9/00791
                                                          701/532
2017/0217434 A1* 8/2017 Halder ................ G05D 1/0274
(Continued)

FOREIGN PATENT DOCUMENTS

JP    2001-324348 A    11/2001
JP    2002-71355 A      3/2002
(Continued)

OTHER PUBLICATIONS

English Translation JP2008185394A.*
(Continued)

*Primary Examiner* — Rami Khatib
(74) *Attorney, Agent, or Firm* — Birch, Stewart, Kolasch & Birch, LLP

(57) ABSTRACT

A map information management device includes a processor; and a memory storing instructions which, when executed by the processor, causes the processor to perform processes of: acquiring map information and determining a guiding route for a vehicle, determining whether the vehicle has operated in accordance with the guiding route, acquiring a position where the vehicle is determined to have operated differently from the guiding route, acquiring an image in which the acquired position is captured, acquiring landmark information from the acquired image, and generating difference information on a difference between the acquired landmark information and landmark information included in map information of the position where the vehicle is determined to have operated differently from the guiding route.

8 Claims, 15 Drawing Sheets

(58) Field of Classification Search
CPC ............ G01C 21/3859; G08G 1/0112; G08G 1/0129; G08G 1/0141; G08G 1/04; G09B 29/106; G09B 29/00
See application file for complete search history.

(56) References Cited

U.S. PATENT DOCUMENTS

2017/0261325 A1* 9/2017 Schroeder .............. G01C 21/04
2019/0271550 A1* 9/2019 Breed .............. G08G 1/096725

FOREIGN PATENT DOCUMENTS

| JP | 2004-205344 A | 7/2004 |
| JP | 2008-185394 A | 8/2008 |
| JP | 2009-245339 A | 10/2009 |
| JP | 2012-173979 A | 9/2012 |

OTHER PUBLICATIONS

Office Action issued in the corresponding Japanese Patent Application No. 2019-550052 dated Apr. 21, 2020 with an English Translation.
International Search Report for PCT/JP2017/039358 (PCT/ISA/210) dated Jan. 23, 2018.

* cited by examiner

FIG. 2

| Landmark ID | Latitude | Longitude | Landmark Name |
|---|---|---|---|
| 0000001 | N35°12'23" | S135°11'10" | Supermarket |
| 0000002 | N35°13'45" | S136°41'44" | Convenience Store |
| 0000003 | N36°22'33" | S137°33'55" | Gas Station |
| 0000004 | N37°00'01" | S137°12'34" | Supermarket |
| ... | ... | ... | ... |

FIG. 3

| # | Action | Latitude | Longitude | Landmark ID | Landmark Name |
|---|---|---|---|---|---|
| 1 | Turn Left | N35°12'23" | S135°11'10" | 0000001 | Supermarket |
| 2 | Turn Right | N36°22'33" | S137°33'55" | 0000003 | Gas Station |

FIG. 4

| Landmark ID | Latitude | Longitude | Landmark Name |
|---|---|---|---|
| 0000003 | N36°22'33" | S137°33'55" | Gas Station |

FIG. 5

| Landmark ID | Former Landmark Name |
|---|---|
| 0000003 | Gas Station |

FIG. 16

| Landmark ID | Former Landmark Name | Updated Landmark Name |
|---|---|---|
| 0000003 | Gas Station | Restaurant |

FIG. 17

(Before Update) Map Information Database

| Landmark ID | Latitude | Longitude | Landmark Name |
|---|---|---|---|
| 0000001 | N35°12'23" | S135°11'10" | Supermarket |
| 0000002 | N35°13'45" | S136°41'44" | Convenience Store |
| 0000003 | N36°22'33" | S137°33'55" | Gas Station |
| 0000004 | N37°00'01" | S137°12'34" | Supermarket |
| ... | ... | ... | ... |

Difference Information

| Landmark ID | Former Landmark Name | Updated Landmark Name |
|---|---|---|
| 0000003 | Gas Station | Restaurant |

(Updated) Map Information Database

| Landmark ID | Latitude | Longitude | Landmark Name |
|---|---|---|---|
| 0000001 | N35°12'23" | S135°11'10" | Supermarket |
| 0000002 | N35°13'45" | S136°41'44" | Convenience Store |
| 0000003 | N36°22'33" | S137°33'55" | Restaurant |
| 0000004 | N37°00'01" | S137°12'34" | Supermarket |
| ... | ... | ... | ... |

MAP INFORMATION MANAGEMENT DEVICE, MAP INFORMATION MANAGEMENT SYSTEM, AND MAP INFORMATION MANAGEMENT METHOD

TECHNICAL FIELD

The present invention relates to a map information management device, a map information management system, and a map information management method for managing map information.

BACKGROUND ART

Map information management devices (refer to Patent Literature 1, for example) of related art aiming at generating map information that is as close to reality as possible are systems for recognizing presence of mismatches between map information and real situations from information provided by users. The provision of information is carried out by voluntary efforts of users who have found the mismatches, and the users need to operate devices to provide information.

CITATION LIST

Patent Literatures

Patent Literature 1: JP 2004-205344 A

SUMMARY OF INVENTION

Technical Problem

In the map information management devices, problems may occur depending on the timing at which a user performs an operation to provide information. For example, in a case where a user provides information while driving, the user may become inattentive or take his eyes off the road owing to the operation. In addition, in a case where a user provides information after termination of driving, the user may forget exact information owing to the time elapsed since the user found a mismatch of map information, and incorrect information may be provided.

The present invention has been made to solve such problems as mentioned above, and an object thereof is to detect a difference between reality and map information without relying on information provided by users.

Solution to Problem

A map information management device according to the present invention includes a processor; and a memory storing instructions which, when executed by the processor, causes the processor to perform processes of information and determining a guiding route for a vehicle, determining whether the vehicle has operated in accordance with the guiding route, acquiring a position where the vehicle is determined to have operated differently from the guiding route, acquiring, an image in which the acquired position, acquiring landmark information from the acquired image, and generating difference information on a difference between the acquired landmark information and landmark information included in map information of the position where the vehicle is determined to have operated differently from the guiding route.

Advantageous Effects of Invention

According to the present invention, difference information on the difference between landmark information acquired from an image capturing a position where a vehicle is determined to have operated differently from a guiding route and landmark information included in map information of the position where the vehicle has operated differently from the guiding route is generated, which enables automatic detection of the difference between reality and the map information without relying on information provided by users.

BRIEF DESCRIPTION OF DRAWINGS

FIG. 2 is a table illustrating an example of landmark information stored in a map information database in the first embodiment.

FIG. 3 is a table illustrating an example of navigation information in the first embodiment.

FIG. 4 is a table illustrating an example of operation mismatch information in the first embodiment.

FIG. 5 is a table illustrating an example of difference information in the first embodiment.

FIG. 16 is a table illustrating an example of difference information in the fourth embodiment.

FIG. 17 illustrates tables explaining a process of updating a map information database performed by an on-board device according to the fourth embodiment.

DESCRIPTION OF EMBODIMENTS

Embodiments for carrying out the invention will now be described with reference to the accompanying drawings for more detailed explanation of the invention.

First Embodiment

Figure 1:
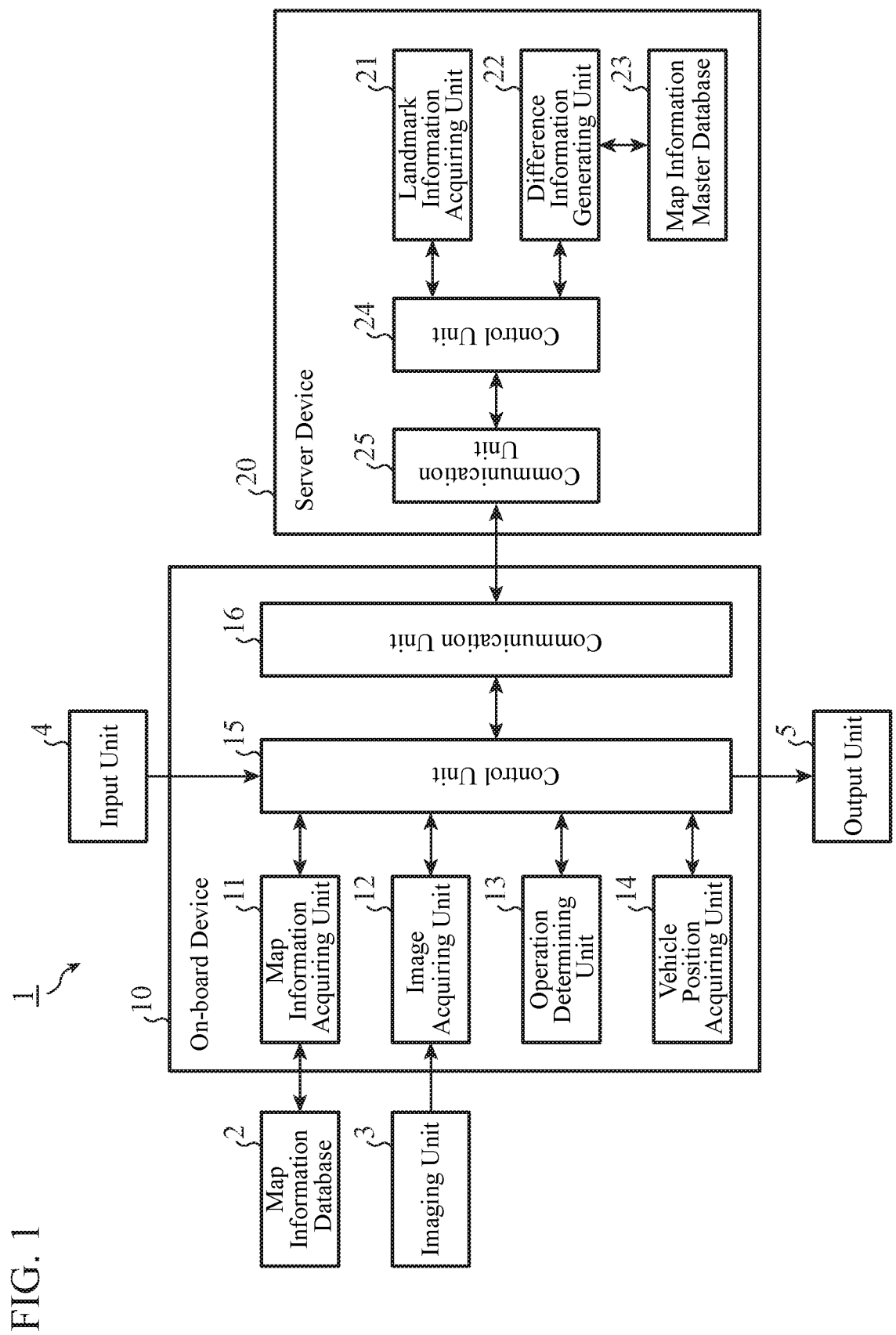
FIG. 1 is a block diagram illustrating an example of a configuration of a map information management system according to a first embodiment.

FIG. 1 is a block diagram illustrating an example of a configuration of a map information management system 1 according to a first embodiment. The map information management system 1 includes an on-board device 10 mounted in a vehicle, and a server device 20 built outside of the vehicle. The on-board device 10 and the server device 20 are connected with each other via a network such as the Internet. Note that a plurality of on-board devices 10 can be connected with one server device 20. The on-board device 10 includes a map information acquiring unit 11, an image acquiring unit 12, an operation determining unit 13, a vehicle position acquiring unit 14, a control unit 15, and a communication unit 16. In addition, the on-board device 10 is connected with a map information database 2, an imaging unit 3, an input unit 4, and an output unit 5. The map information database 2, the imaging unit 3, the input unit 4, and the output unit 5 may be mounted on the vehicle, may be included in an information terminal such as a smartphone, or may be included in the on-board device 10 itself.

The map information database 2 is a database storing map information that can be used in navigation. Map information includes landmark information. FIG. 2 is a table illustrating an example of landmark information stored in the map information database 2 of the first embodiment. Landmark information is information on buildings such as shops that are signs for navigation on a map, and includes unique landmark IDs, position information including latitudes, longitudes, etc., and landmark names.

The imaging unit 3 is a device for capturing an outside view image that is an image of a view outside a vehicle. An outside view image captured by the imaging unit 3 may be a still image or a moving image. The imaging unit 3 is a camcorder, for example.

The input unit 4 is a device for receiving information on an address or the like indicating a destination provided by an operation of a passenger on a vehicle, and inputting the information to the on-board device 10. The input unit 4 is a touch panel, for example. The destination information received by the input unit 4 is input to the map information acquiring unit 11 via the control unit 15.

The output unit 5 is a device for outputting navigation information to guide a driver of a vehicle along a route from the place where the driver is to a destination. The output unit 5 is a display or a speaker, for example.

The map information acquiring unit 11 acquires map information from the map information database 2 by using vehicle position information indicating the current position of the vehicle acquired by the vehicle position acquiring unit 14 and destination information received by the input unit 4. The map information acquiring unit 11 determines a guiding route from the current vehicle position to the destination by using the acquired map information, and generates navigation information for guiding along the route. The navigation information includes the guiding route from the current vehicle position to the destination, and landmark information used for guiding when turning right or left, etc. FIG. 3 is a table illustrating an example of the navigation information in the first embodiment. The navigation information generated by the map information acquiring unit 11 is output to the output unit 5 and the operation determining unit 13 via the control unit 15.

The image acquiring unit 12 acquires an outside view image from the imaging unit 3, and outputs the acquired outside view image to the control unit 15.

The operation determining unit 13 determines whether or not the vehicle has operated in accordance with the guiding route by using the current vehicle position information acquired by the vehicle position acquiring unit 14 and the navigation information generated by the map information acquiring unit 11. For example, in a case where a guide to turn right is provided using a landmark and the vehicle performs an operation different from turning right, the operation determining unit 13 determines that the vehicle has performed an operation different from the guiding route, and generates operation mismatch information. FIG. 4 is a table illustrating an example of the operation mismatch information in the first embodiment. The operation mismatch information includes information of the position at which the vehicle has performed an operation different from the guiding route, and landmark information used for the guiding at the position. Note that, in a case where guiding using a landmark is not provided, the operation determining unit 13 does not generate the operation mismatch information even when the vehicle has performed an operation different from the guiding route. The operation mismatch information generated by the operation determining unit 13 is output to the control unit 15.

The vehicle position acquiring unit 14 acquires information indicating the position, such as the latitude and the longitude, at which the vehicle on which the on-board device 10 is mounted is present. The vehicle position acquiring unit 14 is a global positioning system (GPS) signal receiving device, for example. Alternatively, the vehicle position acquiring unit 14 may acquire position information from a GPS signal receiving device mounted on the vehicle, a smartphone, or the like. The vehicle position information acquired by the vehicle position acquiring unit 14 is output to the map information acquiring unit 11 and the operation determining unit 13 via the control unit 15.

The control unit 15 controls the operations of the map information acquiring unit 11, the image acquiring unit 12, the operation determining unit 13, the vehicle position acquiring unit 14, and the communication unit 16, and controls exchange of information among these components.

The communication unit 16 transmits information to the server device 20, and receives information from the server device 20. The communication unit 16 in the first embodiment transmits, under the control of the control unit 15, the outside view image acquired by the image acquiring unit 12 and the operation mismatch information generated by the operation determining unit 13 to the server device 20.

The server device 20 includes a landmark information acquiring unit 21, a difference information generating unit 22, a map information master database 23, a control unit 24, and a communication unit 25.

The landmark information acquiring unit 21 analyzes the outside view image acquired by the image acquiring unit 12 of the on-board device 10, recognizes what a landmark in the outside view image is, and acquires landmark information. The landmark information acquired by the landmark information acquiring unit 21 is output to the difference information generating unit 22 via the control unit 24.

The difference information generating unit 22 acquires map information including the position indicated by the vehicle position information included in the operation mismatch information generated by the operation determining unit 13 of the on-board device 10 from the map information master database 23. The difference information generating unit 22 detects a mismatch between the landmark information acquired by the landmark information acquiring unit 21 and the landmark information included in the map information acquired from the map information master database 23, and generates difference information. FIG. 5 is a table illustrating an example of the difference information in the first embodiment. The difference information includes a landmark ID and a former landmark name.

The map information master database 23 has a data structure similar to that of the map information database 2 of the vehicle, and stores map information including landmark information.

The control unit 24 controls the operation of the landmark information acquiring unit 21, the difference information generating unit 22, and the communication unit 25, and controls exchange of information among these components.

The communication unit 25 transmits information to the on-board device 10, and receives information from the on-board device 10. The communication unit 25 in the first embodiment receives, under the control of the control unit 24, the outside view image acquired by the image acquiring unit 12 and the operation mismatch information generated by the operation determining unit 13 from the on-board device 10.

Next, operation of the map information management system 1 will be explained with reference to FIGS. 6, 7, and 8.

Figure 6:
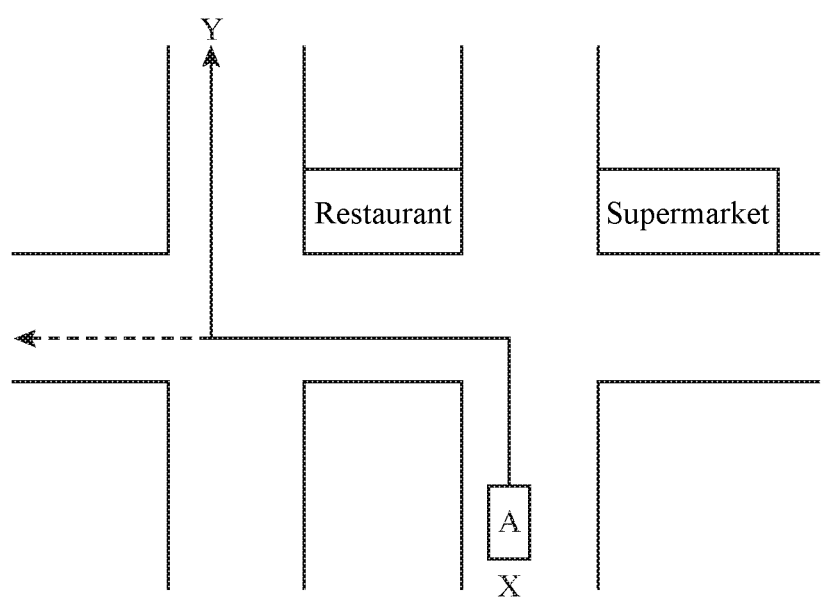
FIG. 6 is a diagram illustrating an example of a guiding route in the first embodiment.

FIG. 6 is a diagram illustrating an example of a guiding route in the first embodiment. Herein, as indicated by a solid arrow in FIG. 6, an example of operation of the map information management system 1 in a situation in which a vehicle A on which the on-board device 10 is mounted is moving from a point X to a point Y following a guiding route and in which a landmark "gas station" on the guiding route is replaced by a "restaurant" will be explained. Assume here that the map information database 2 to which the on-board device 10 mounted on the vehicle A refers and the map information master database 23 of the server device 20 store the landmark information illustrated in FIG. 2. In addition, assume that a "gas station" with a landmark ID "0000003" in FIG. 2 is actually replaced by a "restaurant".

Figure 7:
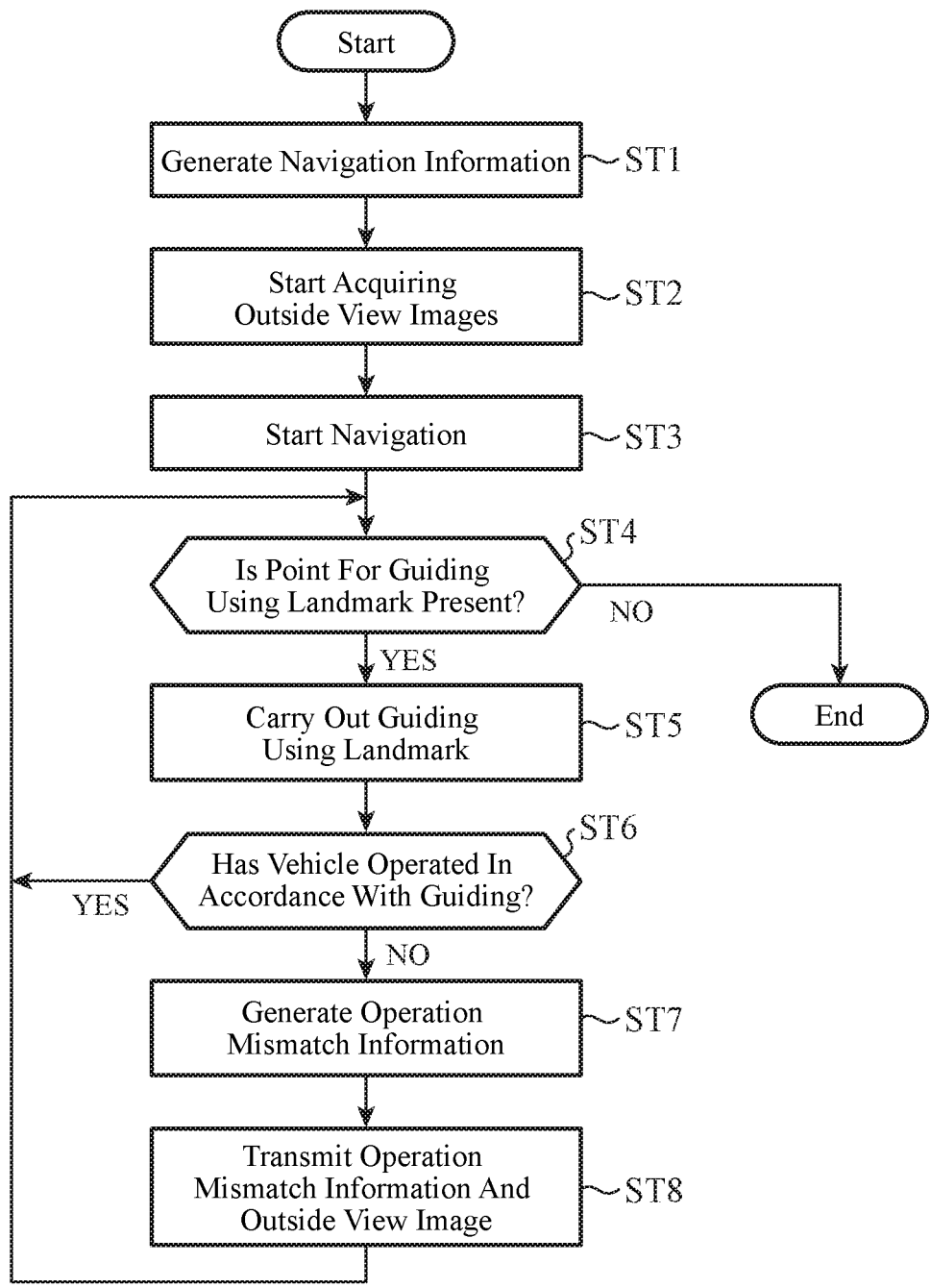
FIG. 7 is a flowchart illustrating an example of operation of an on-board device according to the first embodiment.

FIG. 7 is a flowchart illustrating an example of operation of the on-board device 10 according to the first embodiment.

In step ST1, when destination information indicating the point Y is input from the input unit 4, the map information acquiring unit 11 acquires map information from the map information database 2 by using the destination information and the vehicle position information indicating the point X acquired by the vehicle position acquiring unit 14, and generates navigation information from the point X to the point Y. In the navigation information, a "supermarket" with a landmark ID "0000001" is present, as a landmark for guiding, at a left-turn point, and a "gas station" with a landmark ID "0000003" is present, as a landmark for guiding, at a right-turn point on the guiding route from the point X to the point Y.

In step ST2, the imaging unit 3 starts imaging views outside the vehicle. The imaging unit 3 continues imaging until the point Y, which is the destination, is reached. The image acquiring unit 12 starts acquiring outside view images from the imaging unit 3.

In step ST3, the control unit 15 starts navigation using the navigation information generated by the map information acquiring unit 11. The driver of the vehicle A starts driving toward the point Y in accordance with the navigation information.

In step ST4, if a point where guiding using a landmark is to be provided is present on the guiding route from the current vehicle position to the point Y (step ST4 "YES"), the control unit 15 proceeds to step ST5. If no point where guiding using a landmark is to be provided is present on the guiding route from the current vehicle position to the point Y (step ST4 "NO"), that is, if the vehicle A has reached the point Y, if the guiding route is straight and no right or left turn is present, or the like, the control unit 15 terminates the operation illustrated in the flowchart of FIG. 7.

In step ST5, the control unit 15 causes the output unit 5 to output navigation information saying "turn left at the corner of the supermarket" at the point where guiding using the landmark of navigation information "#1" is to be provided. Because the "supermarket" exists at the point of guiding, the driver turns left at the point of guiding in accordance with the navigation information, and continues driving. The control unit 15 also causes the output unit 5 to output navigation information saying "turn right at the corner of the gas station" at the point where guiding using the landmark of navigation information "#2" is to be provided. Because the "gas station" is replaced by a "restaurant", the driver cannot turn right at the point where the guiding is provided in accordance with the navigation information, and goes straight at the right-turn point as shown by a dashed arrow in FIG. 6.

In step ST6, the operation determining unit 13 determines whether or not the vehicle A has operated in accordance with the guiding using the landmark by using the vehicle position information acquired by the vehicle position acquiring unit 14, and returns to step ST4 if the vehicle A has operated in accordance with the guiding (step ST6 "YES") or proceeds to step ST7 if the vehicle A has operated differently from the guiding (step ST6 "NO"). The operation determining unit 13 determines that the vehicle A has operated in accordance with the guiding saying "turn left at the corner of the supermarket" at the point where the guiding is provided, and determines that the vehicle A has operated differently from the guiding saying "turn right at the corner of the gas station" at the point where the guiding is provided.

In step ST7, the operation determining unit 13 generates operation mismatch information including the vehicle position information of the position where the vehicle A has operated differently from the guiding, and the landmark information of the "gas station".

In step ST8, the control unit 15 acquires the operation mismatch information from the operation determining unit 13, and acquires an outside view image in which the guiding point where the vehicle A has operated differently from the guiding is captured, from the image acquiring unit 12, and outputs the operation mismatch information and the outside view image to the communication unit 16. The communication unit 16 transmits the operation mismatch information and the outside view image to the server device 20.

Figure 8:
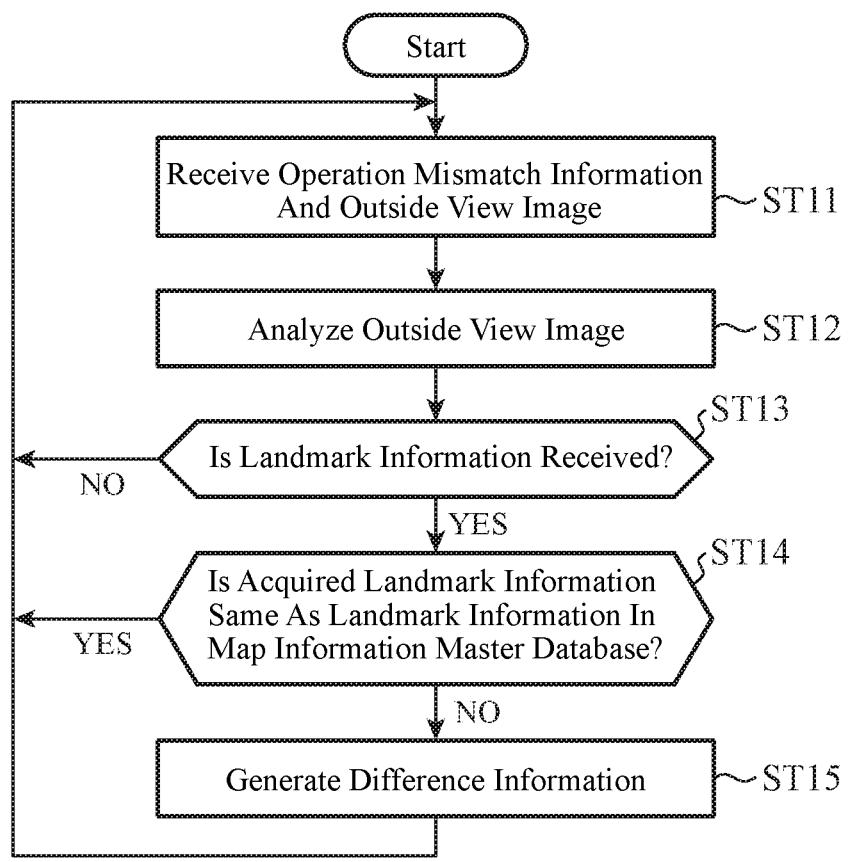
FIG. 8 is a flowchart illustrating an example of operation of a server device according to the first embodiment.

FIG. 8 is a flowchart illustrating an example of operation of the server device 20 according to the first embodiment.

In step ST11, the communication unit 25 receives operation mismatch information and an outside view image from the on-board device 10. The operation mismatch information and the outside view image received by the communication unit 25 are output to the landmark information acquiring unit 21 and the difference information generating unit 22 via the control unit 24.

In step ST12, the landmark information acquiring unit 21 analyzes the outside view image in which the guiding point where the vehicle A has operated differently from the guiding is captured.

In step ST13, if the landmark information acquiring unit 21 recognizes that a restaurant is present at the position of the gas station and acquires the landmark information of the restaurant from the outside view image (step ST13 "YES"), the operation proceeds to step ST14. If the landmark information acquiring unit 21 does not recognize the landmark and does not acquire the landmark information from the outside view image (step ST13 "NO"), the operation returns to step ST11.

In step ST14, the difference information generating unit 22 acquires, from the map information master database 23, landmark information of the map information associated with the vehicle position information that is included in the operation mismatch information and indicates the guiding point where the vehicle A has operated differently from the guiding. The difference information generating unit 22 returns to step ST11 if the landmark information acquired by the landmark information acquiring unit 21 is the same as the landmark information acquired from the map information master database 23 (step ST14 "YES"), or proceeds to step ST15 if the former is different from the latter (step ST14 "NO").

In step ST15, because there is a mismatch in the landmark information with the landmark ID "0000003", the difference information generating unit 22 generates difference information as illustrated in FIG. 5.

As described above, the map information management system 1 according to the first embodiment includes the map information acquiring unit 11, the operation determining unit 13, the vehicle position acquiring unit 14, the image acquiring unit 12, the landmark information acquiring unit 21, and the difference information generating unit 22. The map information acquiring unit 11 acquires map information and determines a guiding route for the vehicle. The operation determining unit 13 determines whether or not the vehicle has operated in accordance with the guiding route. The vehicle position acquiring unit 14 acquires the position where the vehicle is determined to have operated differently from the guiding route by the operation determining unit 13. The image acquiring unit 12 acquires, from the imaging unit 3 mounted on the vehicle, an image in which the position acquired by the vehicle position acquiring unit 14 is captured. The landmark information acquiring unit 21 acquires landmark information from the image acquired by the image acquiring unit 12. The difference information generating unit 22 generates difference information on a difference between the landmark information acquired by the landmark information acquiring unit 21 and the landmark information included in the map information of the position where the vehicle is determined to have operated differently from the guiding route by the operation determining unit 13. This configuration enables the map information management system 1 to automatically detect the difference between reality and map information without relying on information provided by users when the reality and the map information are different from each other owing to replacement of a landmark used in navigation.

Figure 9:
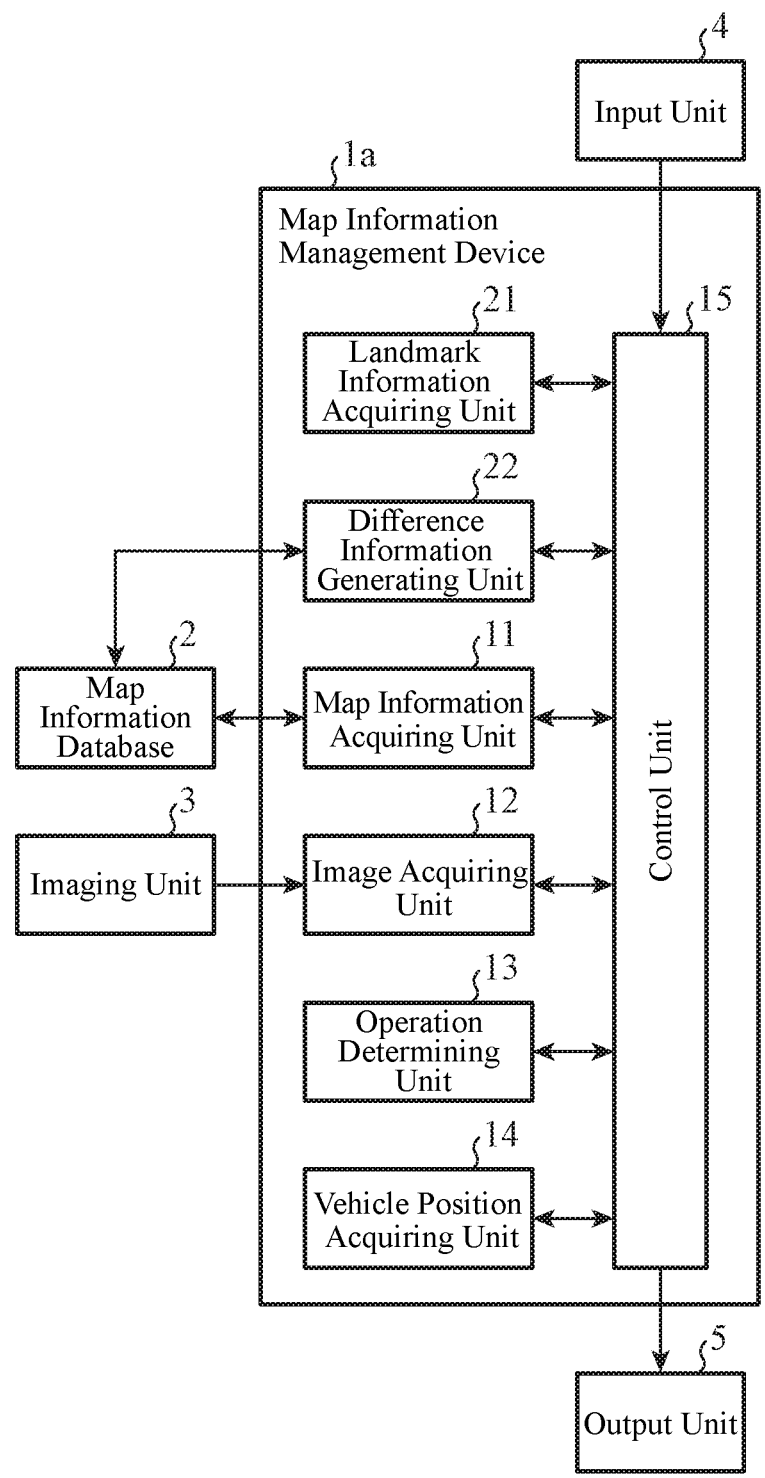
FIG. 9 is a block diagram illustrating an example of a configuration of a map information management device according to the first embodiment.

While the map information management system 1 includes the on-board device 10 and the server device 20 in the first embodiment, the map information management system 1 may be constituted only by the on-board device 10. FIG. 9 is a block diagram illustrating an example of a configuration of a map information management device 1a according to the first embodiment. As illustrated in FIG. 9, the map information management device 1a mounted on a vehicle includes the landmark information acquiring unit 21 and the difference information generating unit 22, in addition to the map information acquiring unit 11, the image acquiring unit 12, the operation determining unit 13, and the vehicle position acquiring unit 14. The difference information generating unit 22 illustrated in FIG. 9 acquires, from the map information database 2, landmark information included in map information of the position indicated by the vehicle position information included in operation mismatch information generated by the operation determining unit 13. The difference information generating unit 22 also detects a mismatch between the landmark information acquired by the landmark information acquiring unit 21 and the landmark information included in the map information acquired from the map information database 2, and generates difference information.

Second Embodiment

Figure 10:
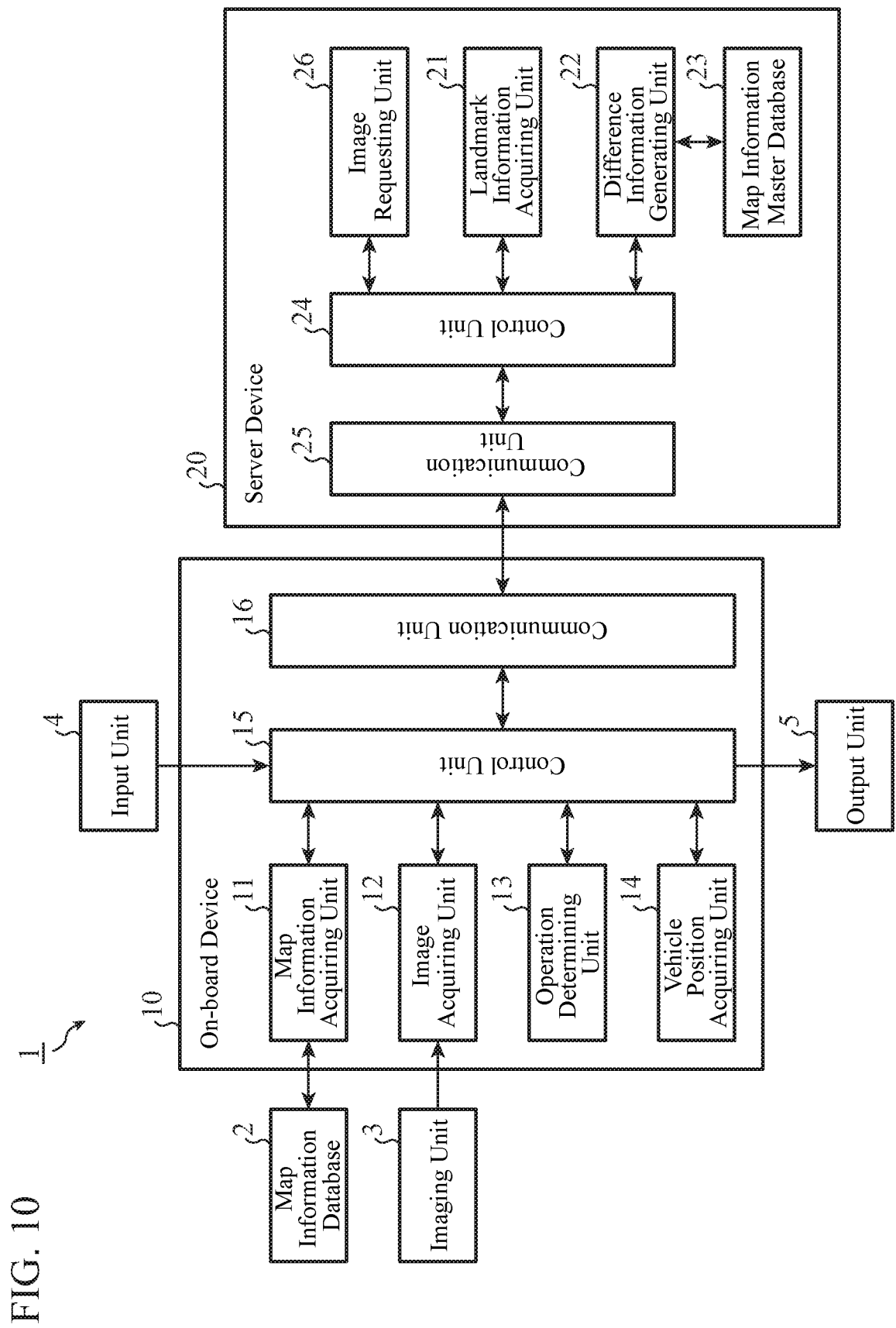
FIG. 10 is a block diagram illustrating an example of a configuration of a map information management system according to a second embodiment.

FIG. 10 is a block diagram illustrating a map information management system 1 according to a second embodiment. A server device 20 according to the second embodiment has a configuration additionally including an image requesting unit 26 in the configuration of the server device 20 of the first embodiment illustrated in FIG. 1. In FIG. 10, components that are the same as or correspond to those in FIG. 1 will be designated by the same reference numerals, and the description thereof will not be repeated.

When the server device 20 has received operation mismatch information, the image requesting unit 26 transmits an image transmission request to a certain vehicle other than the vehicle that has transmitted the operation mismatch information, and causes the certain vehicle to transmit, to the server device 20, an outside view image in which the landmark is captured. An image transmission request is information including position information to be transmitted from the server device 20 to the on-board device 10, and for requesting the on-board device 10 to transmit an outside view image in which the position is captured to the server device 20.

Hereinafter, the vehicle that has transmitted the operation mismatch information, that is, the vehicle A that has found the change of the landmark in the first embodiment will be referred to as a "first vehicle", and the certain vehicle that images the landmark in addition to the first vehicle and transmits an outside view image to the server device 20 will be referred to as a "second vehicle". Note that the on-board device 10 having the configuration illustrated in FIG. 10 is mounted on each of the first vehicle and the second vehicle.

Next, operation of the map information management system 1 according to the second embodiment will be explained.

Figure 11:
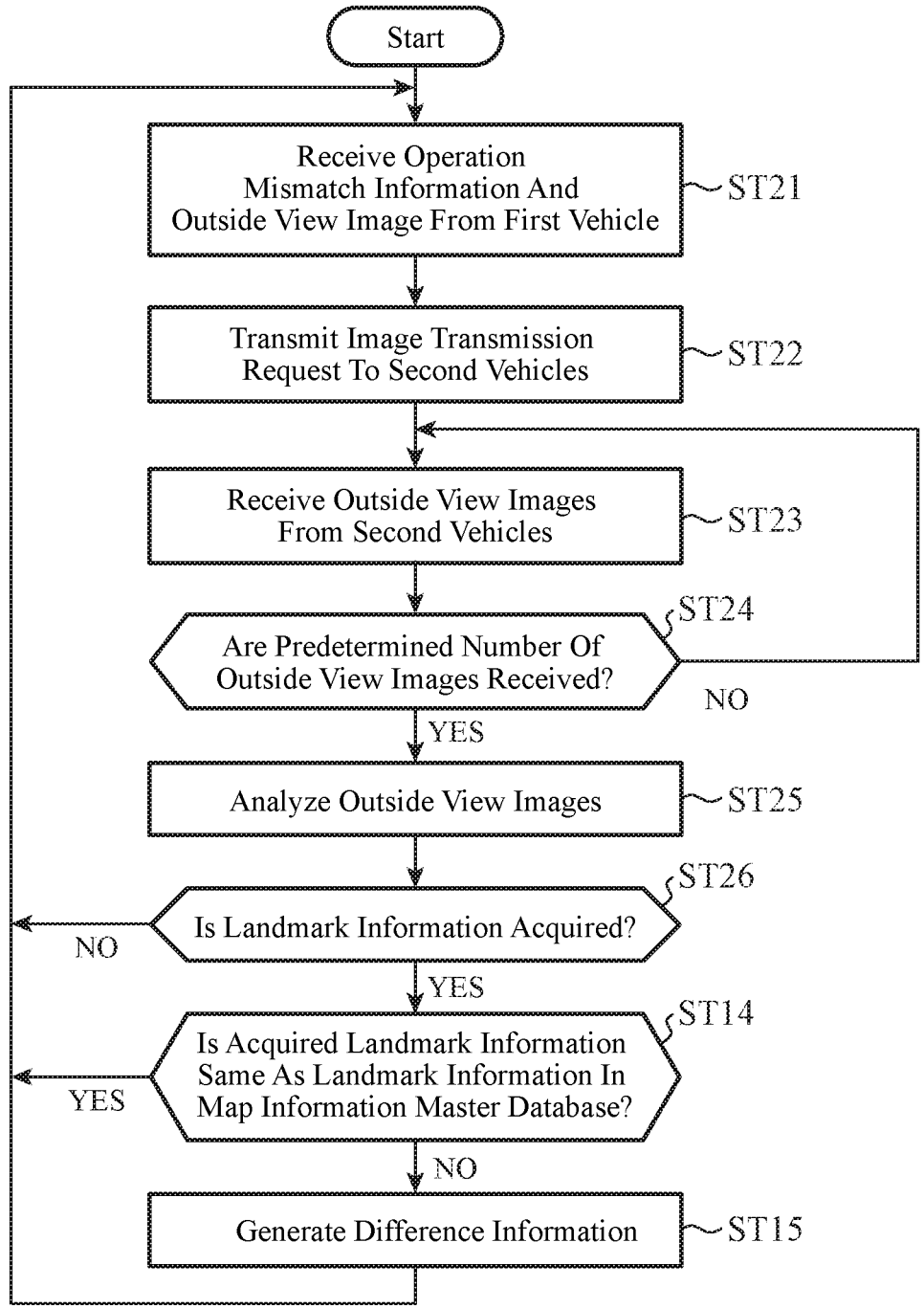
FIG. 11 is a flowchart illustrating an example of operation of a server device according to the second embodiment.

FIG. 11 is a flowchart illustrating an example of operation of the server device 20 according to the second embodiment.

In step ST21, the communication unit 25 receives operation mismatch information and an outside view image from the on-board device 10 of the first vehicle. The operation mismatch information and the outside view image from the first vehicle received by the communication unit 25 are output to the landmark information acquiring unit 21, the difference information generating unit 22, and the image requesting unit 26 via the control unit 24.

In step ST22, the image requesting unit 26 generates an image transmission request by using vehicle position information that is included in the operation mismatch information and indicates the guiding point where the first vehicle has operated differently from the guiding. The image transmission request generated by the image requesting unit 26 is transmitted from the communication unit 25 to the on-board device 10 of the second vehicle via the control unit 24. Note that the image requesting unit 26 may determine one or more certain vehicles, on each of which the on-board device 10 connected with the server device 20 is mounted, as second vehicles, or may detect, as the second vehicles, one or more vehicles traveling near the guiding point where the first vehicle has operated differently from the guiding.

In step ST23, the communication unit 25 receives outside view images from the on-board devices 10 of the second vehicles. The outside view images received by the communication unit 25 are output to the landmark information acquiring unit 21 via the control unit 24.

In step ST24, the landmark information acquiring unit 21 proceeds to step ST25 if a predetermined number of outside view images are received from one or more second vehicles (step ST24 "YES"), or returns to step ST23 if the predetermined number of outside view images have not been received (step ST24 "NO"). Note that the definition of the "predetermined number of outside view images" may be any definition for improving the performance of landmark recognition. For example, the definition is the number of images when the outside view images are still images, or an imaging time when the outside view images are moving images.

In step ST25, the landmark information acquiring unit 21 analyzes the predetermined number of outside view images received from one or more second vehicles in step ST23, and the outside view images received from the first vehicle in step ST21.

In step ST26, the landmark information acquiring unit 21 proceeds to step ST14 if landmark information is acquired from at least one of the predetermine number of outside view images received from one or more second vehicles in step ST23 and the outside view image received from the first vehicle in step ST21 (step ST26 "YES"), or returns to step ST21 if no landmark information is acquired from all the outside view images (step ST26 "NO").

The operations in steps ST14 and ST15 illustrated in the flowchart of FIG. 11 are the same as those in steps ST14 and ST15 illustrated in the flowchart of FIG. 8.

While the server device 20 recognizes the landmark after receiving the predetermined number of outside view images in the flowchart of FIG. 11 so as to improve the landmark recognition performance, the server device 20 is not limited to this configuration and may recognize the landmark each time an outside view image is received from one second vehicle, and terminate the reception when the landmark is successfully recognized. An example thereof is illustrated in the flowchart of FIG. 12.

Figure 12:
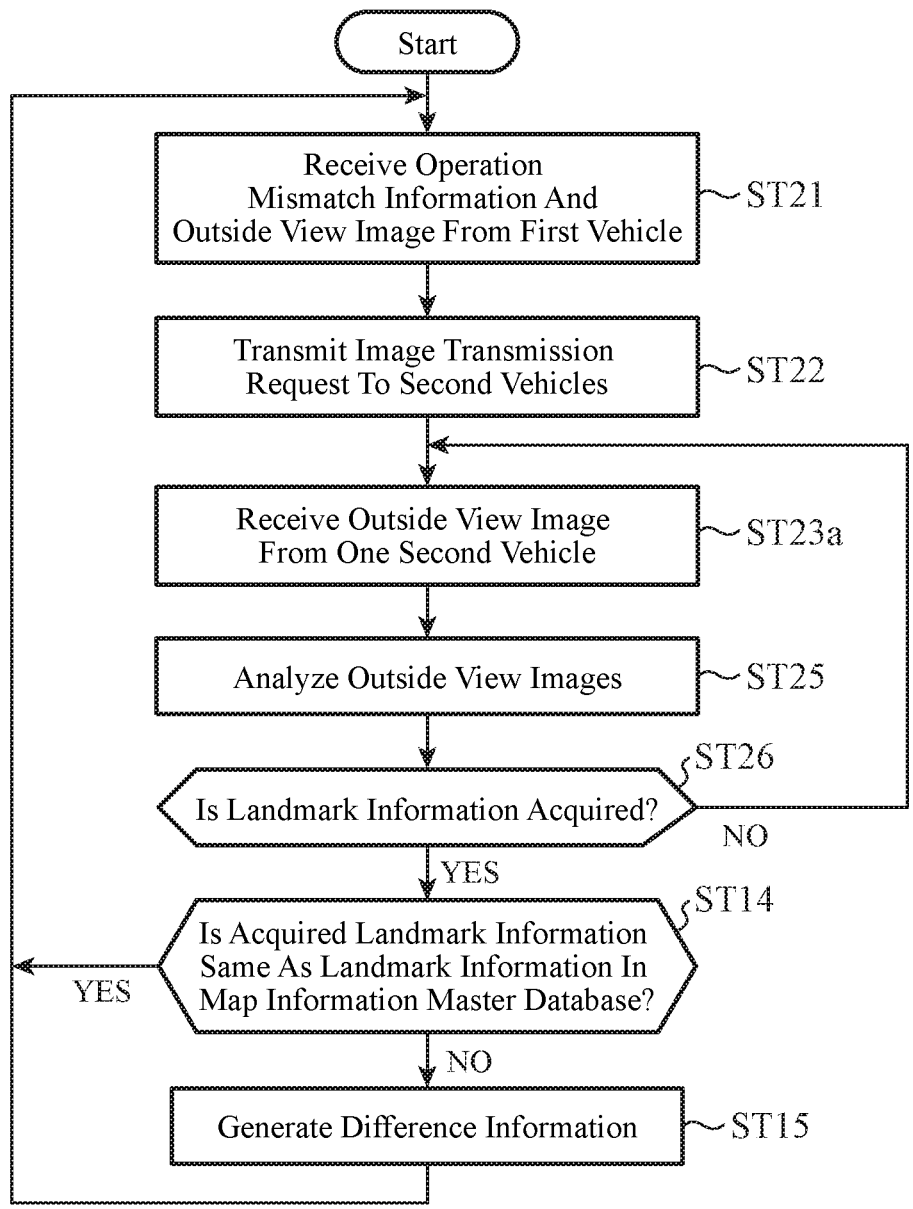
FIG. 12 is a flowchart illustrating a modification of operation of the server device according to the second embodiment.

In step ST23a of FIG. 12, the communication unit 25 receives an outside view image from one of the one or more second vehicles that has transmitted the image transmission requests. In step ST25, the landmark information acquiring unit 21 analyzes the outside view image received from the second vehicle in step ST23a and the outside view image received from the first vehicle in step ST21. In step ST26, the landmark information acquiring unit 21 proceeds to step ST14 if landmark information is acquired from the outside view images (step ST26 "YES"), or returns to step ST23a if landmark information is not acquired from the outside view images (step ST26 "NO"). In the case of FIG. 12, the server device 20 repeats the operations in steps ST23a, ST25, and ST26 until landmark information is acquired from the outside view images.

Figure 13:
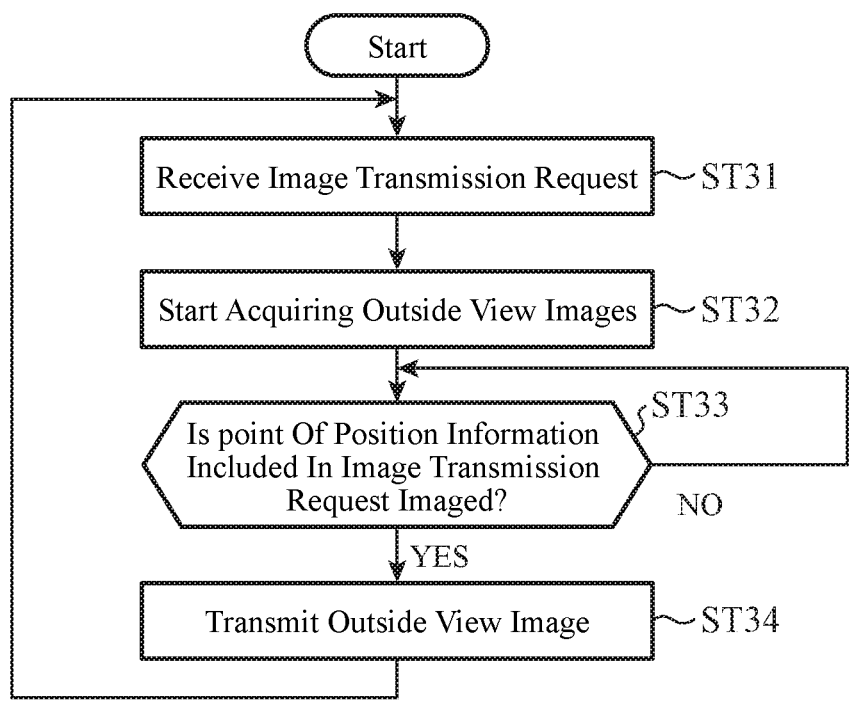
FIG. 13 is a flowchart illustrating an example of operation of an on-board device according to the second embodiment.

FIG. 13 is a flowchart illustrating an example of operation of the on-board device 10 according to the second embodiment. The on-board device 10 mounted on a second vehicle performs the operation illustrated in the flowchart of FIG. 13. The on-board device 10 mounted on the first vehicle performs the operation illustrated in the flowchart of FIG. 7 of the first embodiment, and the explanation thereof will thus not be repeated.

In step ST31, the communication unit 16 of the on-board device 10 mounted on the second vehicle receives an image transmission request from the server device 20. The image transmission request received by the communication unit 16 is output to the image acquiring unit 12 via the control unit 15.

In step ST32, the imaging unit 3 starts imaging views outside the vehicle. The imaging unit 3 continues imaging until the imaging unit 3 completes imaging of an outside view image that matches with the image transmission request. The image acquiring unit 12 starts acquiring outside view images from the imaging unit 3.

In step ST33, the image acquiring unit 12 determines whether or not the point indicated by position information included in the image transmission request is imaged by using the vehicle position information acquired by the vehicle position acquiring unit 14. The image acquiring unit 12 proceeds to step ST34 if the point is imaged (step ST33 "YES"), or repeats step ST33 if the point has not been imaged (step ST33 "NO").

In step ST34, the control unit 15 acquires, from the image acquiring unit 12, the outside view image in which the point indicated by the position information included in the image transmission request is captured, and outputs the outside view image to the communication unit 16. The communication unit 16 transmits the outside view image to the server device 20.

As described above, the server device 20 in the map information management system 1 according to the second embodiment includes the image requesting unit 26. The image requesting unit 26 requests, from the on-board devices 10 mounted on the second vehicles, an image of a position where the first vehicle is determined to have operated differently from the guiding route by the operation determining unit 13 included in the on-board device 10 mounted on the first vehicle. The landmark information acquiring unit 21 acquires landmark information from the images acquired from the on-board devices 10 mounted on the second vehicles in response to the request from the image requesting unit 26. This configuration enables the map information management system 1 to collect more outside view images in which the landmark that has been changed owing to replacement or the like than that in the configuration of the first embodiment. While the map information management system 1 of the first embodiment cannot generate difference information when no landmark information is acquired from the outside view image captured by the vehicle that has operated differently from guiding, the map information management system 1 of the second embodiment is capable of using outside view images captured by other vehicles for acquisition of landmark information, which improves the reliability of generation of difference information.

Note that the map information management system 1 may also be constituted only by the on-board device 10 in the second embodiment, in a manner similar to the first embodiment. In this case, the map information management device 1a illustrated in FIG. 9 includes the communication unit 16 and the image requesting unit 26. The image requesting unit 26 transmits an image transmission request to a map information management device 1a mounted on another vehicle from the communication unit 16 via the control unit 15. In addition, in the map information management device 1a, when the communication unit 16 has received an image transmission request from a map information management device 1a mounted on another certain vehicle, the image acquiring unit 12 acquires, from the imaging unit 3, an outside view image in which the position where the certain vehicle operated differently from a guiding route, and transmits the outside view image to the map information management device 1a mounted on the certain vehicle from the communication unit 16 in accordance with the image transmission request.

Third Embodiment

Figure 14:
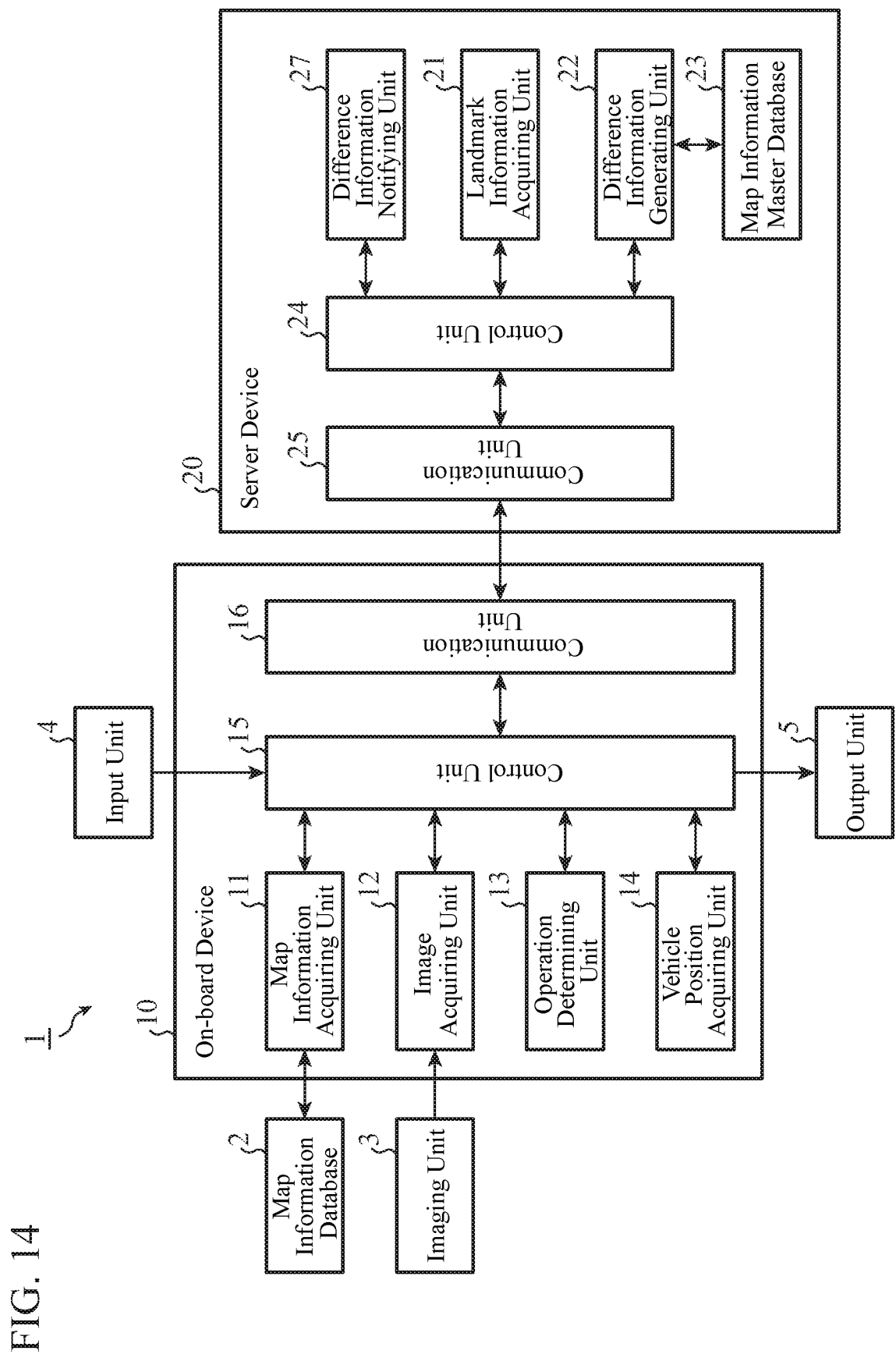
FIG. 14 is a block diagram illustrating an example of a configuration of a map information management system according to a third embodiment.

FIG. 14 is a block diagram illustrating an example of a configuration of a map information management system 1 according to a third embodiment. A server device 20 according to the third embodiment additionally includes a difference information notifying unit 27 in the configuration of the server device 20 of the first embodiment illustrated in FIG. 1. Note that the server device 20 according to the third embodiment may additionally include the difference information notifying unit 27 in the configuration of the server device 20 of the second embodiment illustrated in FIG. 10. In FIG. 14, components that are the same as or correspond to those in FIG. 1, etc. will be designated by the same reference numerals, and the description thereof will not be repeated.

The difference information notifying unit 27 transmits difference information generated by the difference information generating unit 22 to the on-board device 10. As illustrated in FIG. 5, the difference information includes a landmark ID and a landmark name representing a landmark that is different between reality and the map information. The difference information is used so that the landmark will not be used in guiding by the on-board device 10 during navigation, or the like.

Next, operation of the map information management system 1 according to the third embodiment will be explained.

The server device 20 according to the third embodiment operates in accordance with the flowchart illustrated in FIG. 8 of the first embodiment or FIG. 11 or FIG. 12 of the second embodiment, and generates difference information in step ST15. The difference information generated in the difference information generating unit 22 is output to the difference information notifying unit 27 via the control unit 24.

After step ST15, the difference information notifying unit 27 specifies, as the destination of the difference information, the on-board device 10 that has transmitted the operation mismatch information to the server device 20, that is, the on-board device 10 mounted on the vehicle A that has found the change in the landmark in the first embodiment or the first vehicle in the second embodiment. In addition, the difference information notifying unit 27 may also specify, as a destination of the difference information, a certain on-board device 10 connected with the server device 20 in addition to the on-board device 10 that has transmitted the operation mismatch information to the server device 20. The communication unit 25 transmits, under the control of the control unit 24, the difference information to the on-board device 10 that is the destination specified by the difference information notifying unit 27.

The communication unit 16 of the on-board device 10 receives the difference information from the server device 20. The difference information received by the communication unit 16 is output to the map information acquiring unit 11 via the control unit 15. The map information acquiring unit 11 stores the difference information. When generating navigation information, if the landmark ID and the landmark name representing a landmark on a guiding route match with the landmark ID and the landmark name included in difference information, the map information acquiring unit 11 does not include the landmark in the navigation information.

When guiding along a route using the navigation information illustrated in FIG. 3, for example, the control unit 15 of the on-board device 10 does not use the landmark information of the landmark ID "0000003" in guiding of the action "turn right" of "#2". The control unit 15 causes the output unit 5 to output such navigation information as "turn right at the intersection 300 m ahead" that does not use the landmark instead of causing the output unit 5 to output the navigation information saying "turn right at the corner of the gas station".

As described above, the server device 20 of the map information management system 1 according to the third embodiment includes the difference information notifying unit 27. The difference information notifying unit 27 notifies the on-board device 10 of the difference information generated by the difference information generating unit 22. The on-board device 10 performs navigation using the difference information of which the on-board device 10 is notified by the difference information notifying unit 27. This configuration enables the on-board device 10 to perform navigation without using a landmark if the landmark in reality is different from that in the map information. This prevents the driver from being confused by navigation that is different from reality.

Note that the map information management system 1 may also be constituted only by the on-board device 10 in the third embodiment, in a manner similar to the first embodiment. In this case, the map information acquiring unit 11 of the map information management device 1a illustrated in FIG. 9 acquires the difference information generated by the difference information generating unit 22 of the map information management device 1a via the control unit 15, and uses the acquired difference information for generation of navigation information.

Fourth Embodiment

Figure 15:
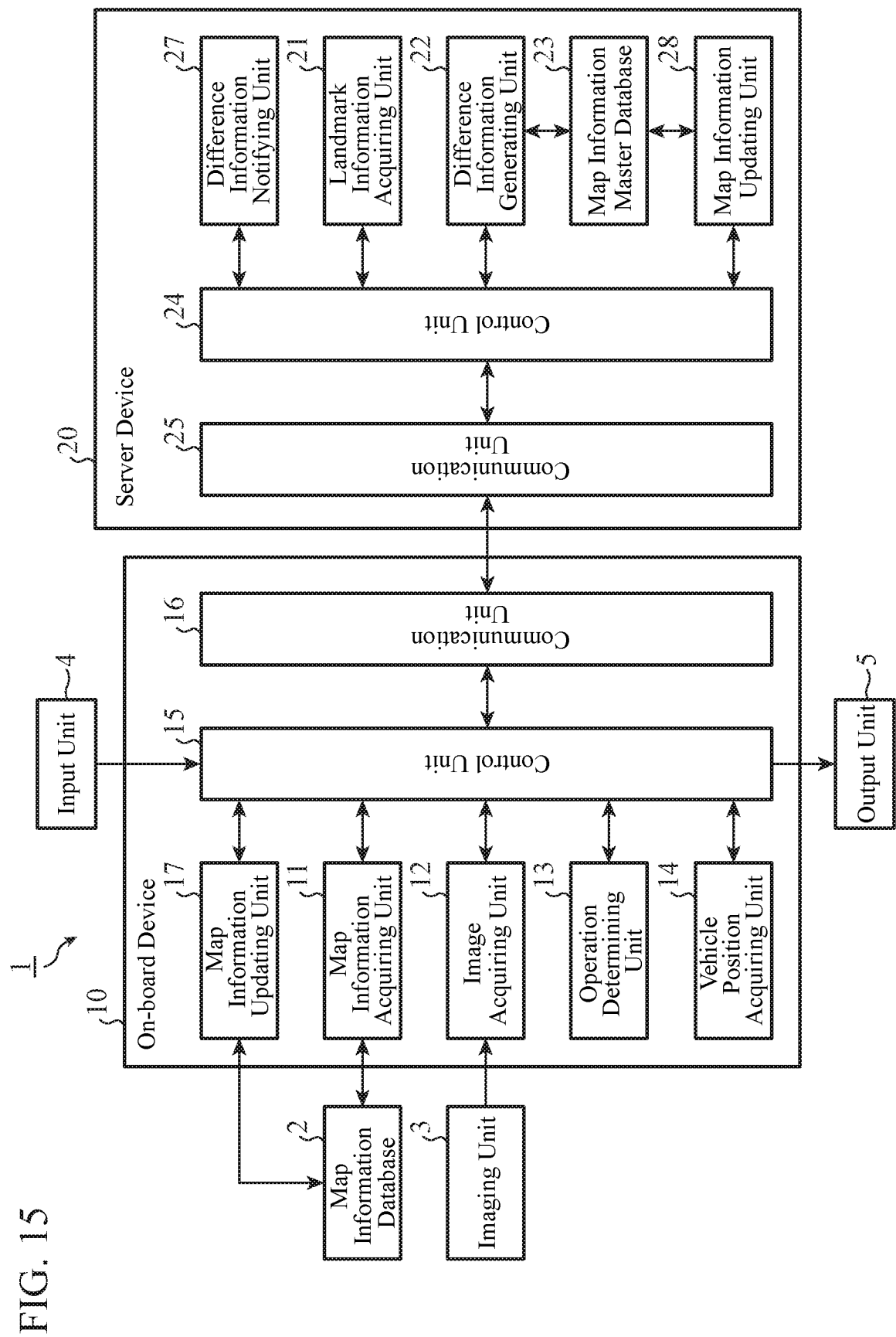
FIG. 15 is a block diagram illustrating an example of a configuration of a map information management system according to a fourth embodiment.

FIG. 15 is a block diagram illustrating an example of a configuration of a map information management system 1 according to a fourth embodiment. An on-board device 10 according to the fourth embodiment additionally includes a map information updating unit 17 in the configuration of the on-board device 10 of the third embodiment illustrated in FIG. 14. In addition, a server device 20 according to the fourth embodiment additionally includes a map information updating unit 28 in the configuration of the server device 20 of the third embodiment illustrated in FIG. 14. In FIG. 15, components that are the same as or correspond to those in FIG. 14 will be designated by the same reference numerals, and the description thereof will not be repeated.

FIG. 16 is a table illustrating an example of difference information in the fourth embodiment. The difference information includes a landmark ID representing a landmark that is different between reality and map information, a former landmark name, and an updated landmark name recognized as a result of analysis of an outside view image.

FIG. 17 illustrates tables explaining a process of updating the map information database 2 performed by the on-board device 10 according to the fourth embodiment. The communication unit 16 of the on-board device 10 receives the difference information as illustrated in FIG. 16 from the server device 20. The difference information received by the communication unit 16 is output to the map information updating unit 17 via the control unit 15. The map information updating unit 17 selects landmark information having a landmark ID matching with the landmark ID included in the difference information from among landmark information stored in the map information database 2, and replace the landmark name of the selected landmark information with the updated landmark name in the difference information. As a result, the landmark name "gas station" with the landmark ID "0000003" in FIG. 17 is updated to "restaurant".

The map information updating unit 28 of the server device 20 updates the landmark information included in the map information stored in the map information master database 23 by using the difference information generated by the difference information generating unit 22. The updating process performed by the map information updating unit 28 is similar to that performed by the map information updating unit 17.

As described above, the on-board device 10 of the map information management system 1 according to the fourth embodiment includes the map information updating unit 17. The map information updating unit 17 updates the landmark information included in the map information on the basis of the difference information provided by the difference information notifying unit 27. This configuration enables the map information management system 1 to automatically update the map information when the landmark is different between reality and the map information. The on-board device 10 is thus capable of performing navigation using the updated landmark information.

Note that the map information management system 1 may also be constituted only by the on-board device 10 in the fourth embodiment, in a manner similar to the first embodiment. In this case, the map information management device 1a illustrated in FIG. 9 includes the map information updating unit 17. The map information updating unit 17 of the map information management device 1a acquires the difference information generated by the difference information generating unit 22 of the map information management device 1a via the control unit 15, and uses the acquired difference information to update the map information database 2.

Finally, a hardware configuration of the map information management system 1 according to each of the embodiments will be described.

Figure 18A:
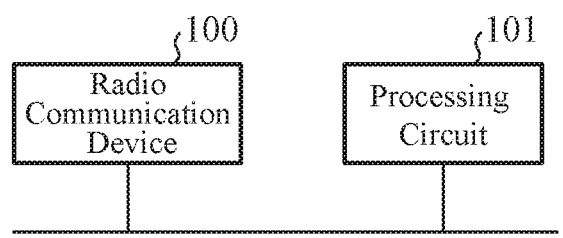
FIGS. 18A and 18B are diagrams illustrating examples of a hardware configuration of the on-board device according to the respective embodiments.
Figure 18B:
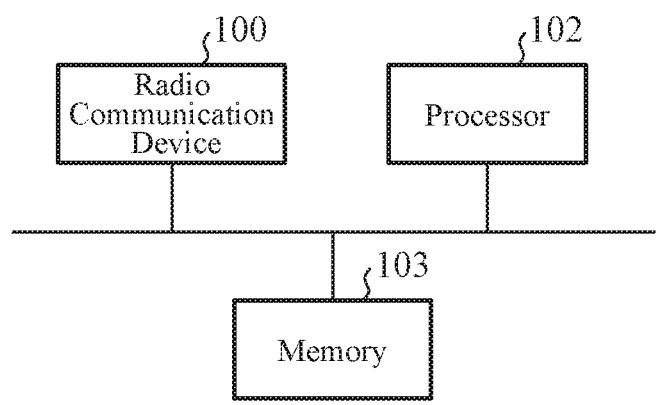

FIGS. 18A and 18B are diagrams illustrating examples of the hardware configuration of the on-board device 10 according to the respective embodiments. The communication unit 16 in the on-board device 10 is a radio communication device 100. The functions of the map information acquiring unit 11, the image acquiring unit 12, the operation determining unit 13, the vehicle position acquiring unit 14, the control unit 15, and the map information updating unit 17 in the on-board device 10 are implemented by a processing circuit. Thus, the on-board device 10 includes a processing circuit for implementing the respective functions described above. The processing circuit may be a processing circuit 101 that is dedicated hardware, or a processor 102 that executes programs stored in a memory 103.

As illustrated in FIG. 18A, in a case where the processing circuit is dedicated hardware, the processing circuit 101 may be a single circuit, a composite circuit, a programmed processor, a parallel-programmed processor, an application specific integrated circuit (ASIC), a field-programmable gate array (FPGA), or a combination thereof, for example. The functions of the map information acquiring unit 11, the image acquiring unit 12, the operation determining unit 13, the vehicle position acquiring unit 14, the control unit 15, and the map information updating unit 17 may be implemented by a plurality of processing circuits 101, or the functions of the respective units may be collectively implemented by one processing circuit 101.

As illustrated in FIG. 18B, in a case where the processing circuit is a processor 102, the functions of the map information acquiring unit 11, the image acquiring unit 12, the operation determining unit 13, the vehicle position acquiring unit 14, the control unit 15, and the map information updating unit 17 are implemented by software, firmware, or combination of software and firmware. The software or firmware is described in the form of programs and stored in the memory 103. The processor 102 implements the functions of the respective units by reading and executing the programs stored in the memory 103. Thus, the on-board device 10 includes the memory 103 for storing programs to be executed by the processor 102, which results in execution of the steps illustrated in the flowchart of FIG. 7, etc. Note that these programs can also be said to cause a computer to execute the procedures or methods of the map information acquiring unit 11, the image acquiring unit 12, the operation determining unit 13, the vehicle position acquiring unit 14, the control unit 15, and the map information updating unit 17.

Alternatively, some of the functions of the map information acquiring unit 11, the image acquiring unit 12, the operation determining unit 13, the vehicle position acquiring unit 14, the control unit 15, and the map information updating unit 17 may be implemented by dedicated hardware, and others may be implemented by software or firmware. As described above, the processing circuit in the on-board device 10 is capable of implementing the functions described above by hardware, software, firmware, or a combination thereof.

Figure 19A:
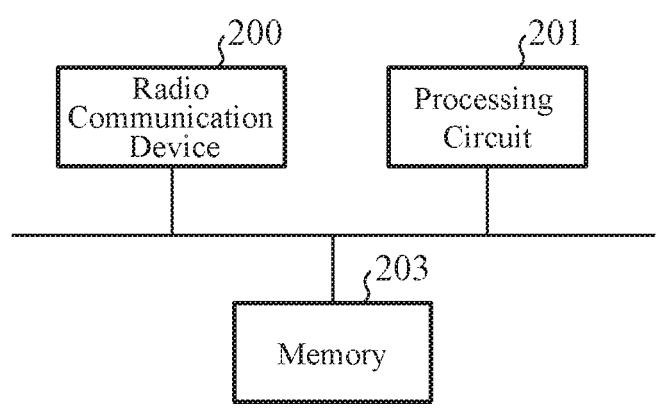
FIGS. 19A and 19B are diagrams illustrating examples of a hardware configuration of the server device according to the respective embodiments.
Figure 19B:
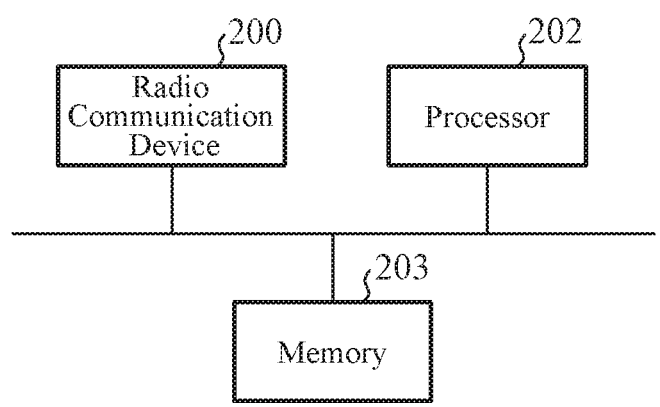

FIGS. 19A and 19B are diagrams illustrating examples of the hardware configuration of the server device 20 according to the respective embodiments. The communication unit 25 in the server device 20 is a radio communication device 200. The map information master database 23 in the server device 20 is a memory 203. The functions of the landmark information acquiring unit 21, the difference information generating unit 22, the control unit 24, the image requesting unit 26, the difference information notifying unit 27, and the map information updating unit 28 in the server device 20 are implemented by a processing circuit. Thus, the server device 20 includes a processing circuit for implementing the functions described above. The processing circuit may be a processing circuit 201 that is dedicated hardware, or a processor 202 that executes programs stored in a memory 203.

As illustrated in FIG. 19A, in a case where the processing circuit is dedicated hardware, the processing circuit 201 may be a single circuit, a composite circuit, a programmed processor, a parallel-programmed processor, an ASIC, an FPGA, or a combination thereof, for example. The functions of the landmark information acquiring unit 21, the difference information generating unit 22, the control unit 24, the image requesting unit 26, the difference information notifying unit 27, and the map information updating unit 28 may be implemented by a plurality of processing circuits 201, or the functions of the respective units may be collectively implemented by one processing circuit 201.

As FIG. 19B, in a case where the processing circuit is a processor 202, the functions of the landmark information acquiring unit 21, the difference information generating unit 22, the control unit 24, the image requesting unit 26, the difference information notifying unit 27, and the map information updating unit 28 are implemented by software, firmware, or combination of software and firmware. The software or firmware is described in the form of programs and stored in the memory 203. The processor 202 implements the functions of the respective units by reading and executing the programs stored in the memory 203. Thus, the server device 20 includes the memory 203 for storing programs to be executed by the processor 202, which results in execution of the steps illustrated in the flowchart of FIG. 8, etc. Note that these programs can also be said to cause a computer to execute the procedures or methods of the landmark information acquiring unit 21, the difference information generating unit 22, the control unit 24, the image requesting unit 26, the difference information notifying unit 27, and the map information updating unit 28.

Alternatively, some of the functions of the landmark information acquiring unit 21, the difference information generating unit 22, the control unit 24, the image requesting unit 26, the difference information notifying unit 27, and the map information updating unit 28 may be implemented by dedicated hardware and others may be implemented by software or firmware. As described above, the processing circuit in the server device 20 is capable of implementing the functions described above by hardware, software, firmware, or a combination thereof.

Note that the processors 102 and 202 are central processing units (CPUs), processing units, computing units, microprocessors, microcomputers, or the like.

The memories 103 and 203 may be nonvolatile or volatile semiconductor memories such as random access memories (RAMs), read only memories (ROMs), erasable programmable ROMs (EPROMs), or flash memories, magnetic disks such as hard disks or flexible disks, or optical discs such as compact discs (CDs) or digital versatile discs (DVDs).

Note that the functions of the map information acquiring unit 11, the image acquiring unit 12, the operation determining unit 13, the vehicle position acquiring unit 14, the control unit 15, the landmark information acquiring unit 21, and the difference information generating unit 22 in the map information management device 1a illustrated in FIG. 9 are implemented by a processing circuit. Thus, the map information management device 1a includes a processing circuit for implementing the functions described above. The processing circuit may be a processing circuit that is dedicated hardware, or a processor that executes programs stored in a memory.

The embodiments of the present invention can be freely combined, any components in the embodiments can be modified, and any components in the embodiments can be omitted within the scope of the invention.

INDUSTRIAL APPLICABILITY

A map information management system according to the present invention automatically detect a mismatch between reality and map information, which is thus suitable for use as a map information management system or the like for managing map information to be used by a navigation device for a movable body such as a vehicle.

REFERENCE SIGNS LIST

1: map information management system, 1a: map information management device, 2: map information database, 3: imaging unit, 4: input unit, 5: output unit, 10: on-board device, 11: map information acquiring unit, 12: image acquiring unit, 13: operation determining unit, 14: vehicle position acquiring unit, 15: control unit, 16: communication unit, 17: map information updating unit, 20: server device, 21: landmark information acquiring unit, 22: difference information generating unit, 23: map information master database, 24: control unit, 25: communication unit, 26: image requesting unit, 27: difference information notifying unit, 28: map information updating unit, 100, 200: radio communication device, 101, 201: processing circuit, 102, 202: processor, 103, 203: memory, A: vehicle, X, Y: point.

The invention claimed is:

1. A map information management device comprising:
a processor; and
a memory storing instructions and map information including landmark information, which, when executed by the processor, causes the processor to perform processes of:
acquiring the map information and determining a guiding route for a vehicle;
providing the determined guiding route including the landmark information to a user,
determining whether the vehicle has operated in accordance with the guiding route;
acquiring a position where the vehicle is determined to have operated differently from the guiding route because of the stored landmark information;
acquiring an image in which the acquired position is captured;
acquiring actual landmark information from the acquired image;
generating difference information on a difference between the acquired actual landmark information and the stored landmark information included in map information of the position where the vehicle is determined to have operated differently from the guiding route; and
automatically updating landmark information included in the map information on a basis of the generated difference information to provide the guiding route with the actual landmark information next time.

2. The map information management device according to claim 1,
wherein the processor detects another vehicle, other than the vehicle that has operated differently from the guiding route, traveling in a vicinity of the position where the vehicle is determined to have operated differently from the guiding route, and
the processor acquires an image captured by the another vehicle at the position where the vehicle has operated differently from the guiding route.

3. A map information management system comprising a server device, and at least one on-board device mounted on a vehicle,
wherein the at least one on-board device includes:
a first processor; and
a first memory storing instructions which, when executed by the first processor, causes the first processor to perform first processes of:

acquiring map information including landmark information and determining a guiding route for a vehicle;
providing the determined guiding route including the landmark information to a user;
determining whether the vehicle has operated in accordance with the guiding route;
acquiring a position where the vehicle is determined to have operated differently from the guiding route because of the stored landmark information; and
acquiring an image in which the acquired position is captured;
acquiring actual landmark information from the acquired image; and
transmitting the acquired position and the acquired image, and
the server device includes:
a second processor; and
a second memory storing instructions which, when executed by the second processor, causes the second processor to perform second processes of:
receiving the transmitted acquired position and the acquired image;
acquiring landmark information from the acquired image;
generating difference information on a difference between the acquired landmark information and landmark information included in map information of the position where the vehicle is determined to have operated differently from the guiding route; and
automatically updating landmark information included in the map information on a basis of the generated difference information to provide the guiding route with the actual landmark information next time.

4. The map information management system according to claim 3,
at least one on-board device comprises a first on-board device and a second on-board device,
wherein the second processes further include requesting an image of a position where a first vehicle is determined to have operated differently from a guiding route included in the first on-board device mounted on the first vehicle from the second on-board device mounted on a second vehicle, and
the second processor acquires landmark information from the image acquired from the second on-board device mounted on the second vehicle in response to the request.

5. The map information management system according to claim 3,
wherein the second processes further include notifying the at least one on-board device of the generated difference information, and
the at least one on-board device performs navigation on a basis of the provided difference information.

6. The map information management system according to claim 5,
wherein the first processes further include updating landmark information included in the map information on the basis of the provided difference information.

7. A map information management method comprising:
acquiring map information including landmark information, and determining a guiding route for a vehicle;
determining whether the vehicle has operated in accordance with the guiding route;
acquiring a position where the vehicle is determined to have operated differently from the guiding route because of the stored landmark information;
acquiring an image in which the acquired position is captured;
acquiring actual landmark information from the acquired image;
generating difference information on a difference between the acquired actual landmark information and the stored landmark information included in map information of the position where the vehicle is determined to have operated differently from the guiding route; and
automatically updating the landmark information included in the map information on a basis of the generated difference information to provide the guiding route with the actual landmark information next time.

8. A map information management system, comprising a server device, and at least one on-board device mounted on a vehicle,
wherein the at least one on-board device includes:
a first processor; and
a first memory storing instructions which, when executed by the first processor, causes the first processor to perform first processes of:
acquiring map information and determining a guiding route for a vehicle;
determining whether the vehicle has operated in accordance with the guiding route;
acquiring a position where the vehicle is determined to have operated differently from the guiding route;
acquiring an image in which the acquired position is captured; and
transmitting the acquired position and the acquired image,
the server device includes:
a second processor; and
a second memory storing instructions which, when executed by the second processor, causes the second processor to perform second processes of:
receiving the transmitted acquired position and the acquired image;
acquiring landmark information from the acquired image; and
generating difference information on a difference between the acquired landmark information and landmark information included in map information of the position where the vehicle is determined to have operated differently from the guiding route,
the at least one on-board device comprises a first on-board device and a second on-board device,
wherein the second processes further include requesting an image of a position where a first vehicle is determined to have operated differently from a guiding route included in the first on-board device mounted on the first vehicle from the second on-board device mounted on a second vehicle, and
the second processor acquires landmark information from the image acquired from the second on-board device mounted on the second vehicle in response to the request.

* * * * *